United States Patent [19]
Austin et al.

[11] Patent Number: 5,129,253
[45] Date of Patent: Jul. 14, 1992

[54] ANTIFRETTING COATING FOR A BUSHING IN A COLDWORKED JOINT

[75] Inventors: John Austin; Harrie M. Lawton, both of Hurst, Tex.

[73] Assignee: Bell Helicopter Textron Inc., Fort Worth, Tex.

[21] Appl. No.: 471,281

[22] Filed: Jan. 26, 1990

[51] Int. Cl.⁵ .................. B21D 39/08; B21D 39/06; B23P 19/02
[52] U.S. Cl. ........................ 72/370; 29/525; 29/523; 29/426.4; 29/458
[58] Field of Search ........... 72/370, 391.4; 29/525, 29/523, 426.4, 469.5, 458; 428/35.8, 418; 403/408.1

[56] References Cited

U.S. PATENT DOCUMENTS

| | | | |
|---|---|---|---|
| 2,411,246 | 11/1946 | Clapper | 29/157.4 |
| 3,193,857 | 7/1965 | Kahn | 10/152 R |
| 3,828,412 | 8/1974 | Dreskler | 29/458 |
| 3,835,688 | 9/1974 | King | 72/370 |
| 3,879,980 | 4/1975 | King, Jr. | 72/391.4 |
| 4,164,807 | 8/1979 | King, Jr. | 29/523 |
| 4,241,976 | 7/1979 | Oliver et al. | 29/458 |
| 4,277,200 | 7/1981 | Speakman | 403/408.1 |
| 4,405,256 | 9/1983 | King | 29/523 |
| 4,433,567 | 2/1984 | Mead | 72/370 |
| 4,457,157 | 7/1984 | Masaki et al. | 72/354 |
| 4,500,577 | 2/1985 | Satake et al. | 428/36 |
| 4,557,033 | 12/1985 | Champoux | 72/370 |
| 4,593,448 | 6/1986 | Ferrari Aggradi et al. | 29/523 |
| 4,642,248 | 2/1987 | Howland | 427/224 |
| 4,662,663 | 5/1987 | Schmitz | 29/523 |
| 4,770,896 | 9/1988 | Crown et al. | 427/29 |

FOREIGN PATENT DOCUMENTS 2096675 10/1982 United Kingdom .

OTHER PUBLICATIONS

Brochure, "Corvell Coating Powders", 1974, pp. 4 and 5.
Scotchkote Protective Resin No. K1001/Scotchkote Brand, 1 page.

Primary Examiner—Robert L. Spruill
Assistant Examiner—Donald M. Gurley
Attorney, Agent, or Firm—Richards, Medlock & Andrews

[57] ABSTRACT

A coating is applied to the outside diameter surface of a bushing used to coldwork in a hole in a work piece. The bushing having the coating is positioned and fixed axially with respect to the hole and then expanded by an expansion mandrel with the coating on the outside diameter surface of the bushing coming into contact with the walls of the hole and the hole being coldworked. The coating reduces fretting of the coldworked joint thereby increasing the fatigue life of the joint. The bushing having the coating can be easily removed, and then replaced, by boring out the old bushing since the coating provides a margin of machining error and thereby protects the walls of the hole.

6 Claims, 3 Drawing Sheets

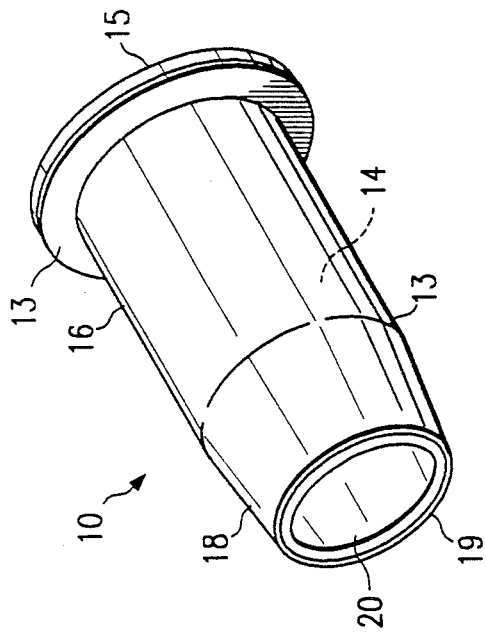
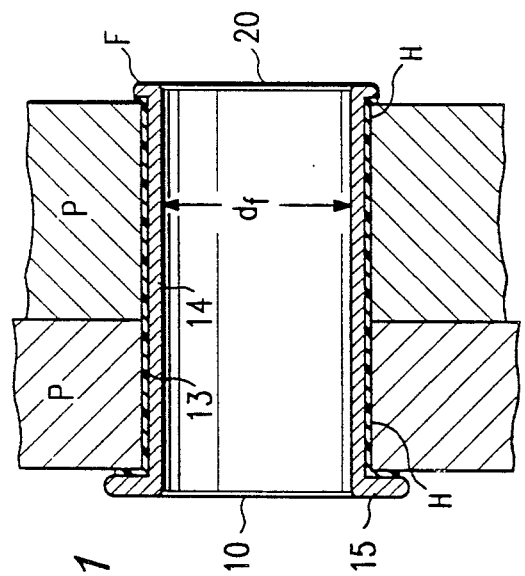
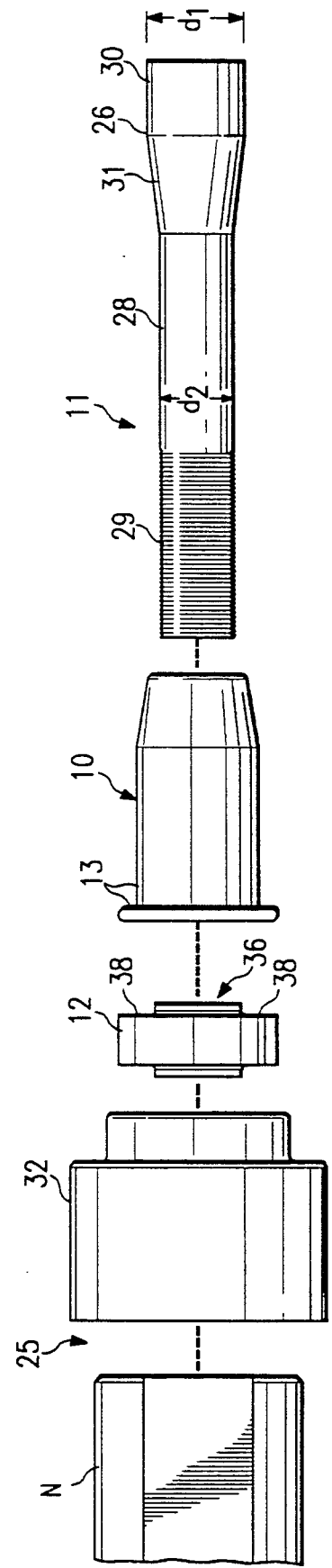
FIG. 1
FIG. 2
FIG. 3

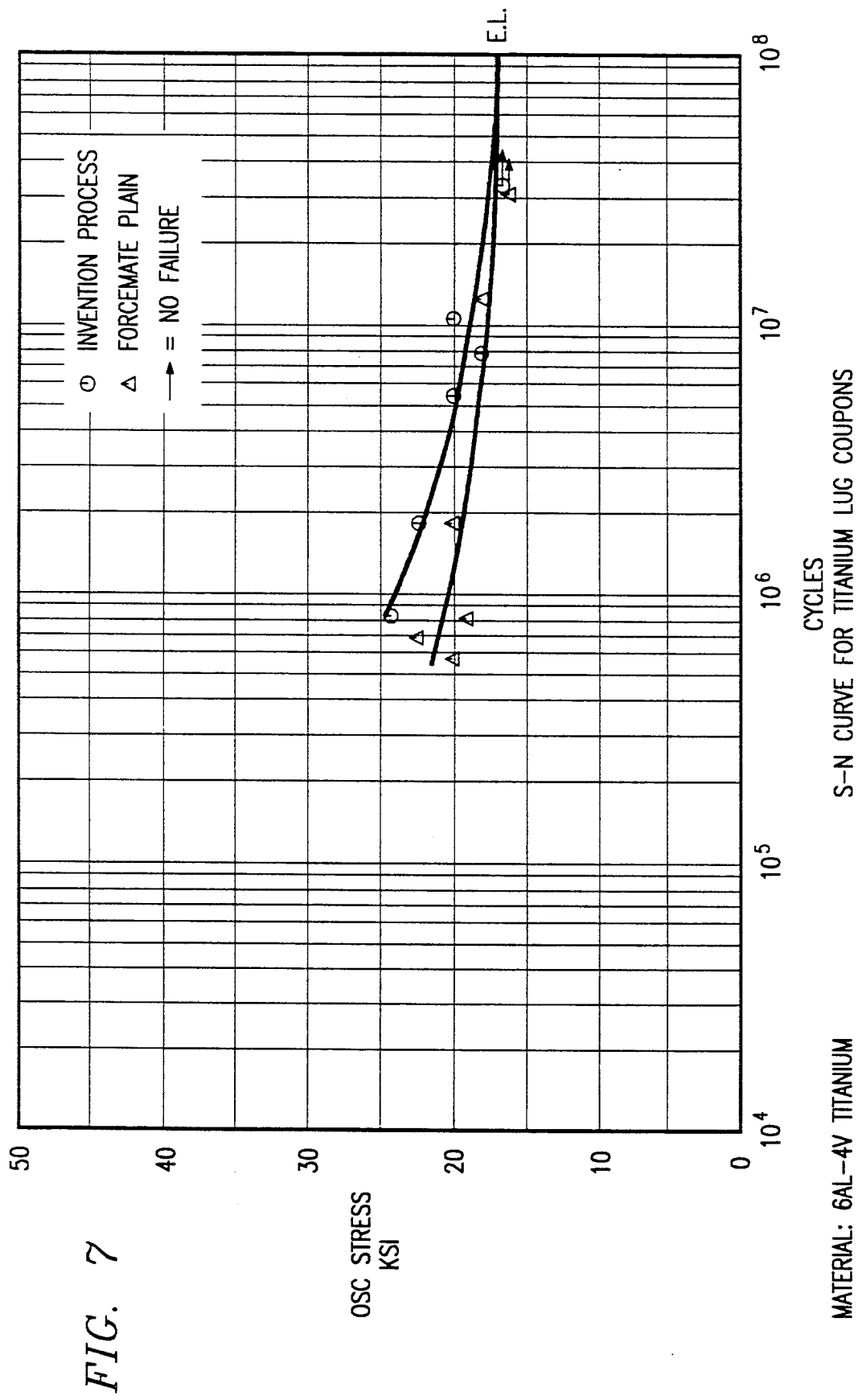

ANTIFRETTING COATING FOR A BUSHING IN A COLDWORKED JOINT

TECHNICAL FIELD OF THE INVENTION

This invention relates to coldworking a hole through a work piece by placing a bushing within the hole and aligning the bushing to be expanded. In particular, this invention relates to placing a coating on the exterior surface of the bushing used in forming the coldworked joint so as to increase the fatigue life of the joint by reducing fretting, and as to allow the bushing to be easily replaced.

BACKGROUND OF THE INVENTION

When separate parts are to be connected together, a typical procedure involves bolting or riveting the parts together. Some sort of bolting device is usually fitted through a hole in each part to bolt the parts together to form a joint. There are many applications for these joints, such as in aircraft and in other vehicles. During operation, aircraft and other vehicles are subjected to oscillatory or dynamic loading. Such oscillatory loading produces stress on the joint and if the amount of this stress and the number of oscillatory cycles of stress are great enough, fatiguing of the joint will result. Such fatiguing is exhibited as cracks or breaks in the joint.

Various patents have disclosed methods of increasing the fatigue life of joints. U.S. Pat. No. 4,164,807 discloses a method of forming a coldworked joint. The patent describes placing a seamless tubular member or bushing within a hole through a work piece where the tubular member has a prescribed hoop strength sufficiently to allow the seamless tubular member to be radially and circumferentially expanded a first prescribed amount, and a prescribed column strength sufficient to substantially prevent axial movement of the outside of the tubular movement as the tubular member is expanded through the hole. The tubular member is held within the hole so that it is substantially axially fixed with respect to the hole. An expansion mandrel, having an expansion section thereon with a maximum diameter a second prescribed amount greater than the inside diameter of the tubular member, is passed through the tubular member to expand the tubular member radially and circumferentially sufficiently to induce a compressive stress gradient of a prescribed magnitude in the material of the work piece substantially uniformly about the entire surface of the hole. The inducement of this compressive stress gradient increases the fatigue strength of the hole.

The method described above with reference to the patent has limitations. Microscopic metal on metal friction related stress, commonly referred to as fretting, between the tubular member and the walls of the hole reduces fatigue strength. Although coldworking the hole as described above increases the fatigue strength, fretting limits the increase in the fatigue strength. The fatigue strength of parts which exhibit fretting is historically less predictable than without fretting. Another disadvantage with the method is that the tubular member is difficult to replace during a repair or overhaul operation. Due to the high interference fit between the tubular member and the walls of the hole, pressing out the tubular member is not recommended as this would damage the walls of the hole and the work piece. Furthermore, machining out the tubular member is not suitable since this operation could also damage the walls of the hole.

Therefore, it is an object of this invention to reduce fretting thereby increasing the fatigue life of the joint. Furthermore, it is an object of this invention to allow the tubular member (hereinafter referred to as the bushing) to be easily replaced without damage to the hole, during a repair or overhaul operation.

SUMMARY OF THE INVENTION

This invention improves on a forcemate process such as disclosed in U.S. Pat. No. 4,164,807 which discloses a method of forming a coldworked joint. In this invention, a bushing having a coating on its outside diameter exterior surface is placed inside of a pilot hole of a work piece. The bushing having the coating is held in the hole by a backup member while a mandrel is withdrawn through the bushing to enlarge the bushing so that the coating becomes in engagement with the work piece and so as to induce a radially oriented compressive stress gradient about the hole to increase the fatigue life of the hole. The column strength of the bushing is sufficient to substantially prevent axial movement of the bushing with respect to the work piece as the mandrel is forced therethrough so as to substantially eliminate any axially oriented tensile stress in the work piece about the hole as it is enlarged. If the bushing used to enlarge the hole has less of a tendency to recover than the material of the work piece, and if this bushing is left in the hole after the hole has been enlarged, the size of the resulting hole or passageway through the bushing is substantially constant.

The invention utilizes a coating between the work piece and the outside diameter surface of the bushing which mates with the work piece to achieve significant improvement in the joint. The bushings used in this invention have a reduced outside diameter sufficient to accommodate the coating, preferably of approximately 0.01 inches in comparison to a plain coldworking bushing for the same size hole when the coating thickness is about 0.005 inches. This reduction in the outside diameter is designed to accommodate a coating thickness. The final coating thickness should range from about 0.004 inches to about 0.009 inches. Preferably, the final thickness is from about 0.0045 to about 0.0055. The coating can be applied in excess of these thicknesses and later machined to the desired thickness. Preferably, an epoxy resin is coated to the outside diameter surface of the bushing using fluidized bed or electrostatic spray application techniques. Since the thickness of the coating can be applied unevenly during these techniques, the coated surface of the bushing may be machined so that the coating thickness is uniform around the circumference of the bushing. Other materials that could be used for the coating are adhesive films which are physically bonded to the outside diameter surface of the bushing using epoxy adhesive.

The addition of the coating to the bushing provides certain advantages over the bushings without coatings in the previous coldworking processes. One advantage is that the coating is essentially an antifretting barrier which eliminates and/or reduces the fretting which occurs between the outside surface of the bushing and the walls of the hole in the work piece. The joint that results from using a bushing having a coating has an increased fatigue life compared to prior coldworked joints. Another advantage of using a bushing with a coating is that the bushing can be easily removed and replaced during a repair or overhaul operation. Once the coldworking bushing has been expanded into contact with the hole in the work piece, it is difficult to replace without damaging the walls of the hole in the work piece. This is due primarily to the high interference fit of the bushing within the hole. Applying a coating to the bushing overcomes the risk of damage to the walls of the hole. The replacement procedure for the coated bushing involves boring out the old bushing to the point that the bushing collapses or to the point that all the bushing metal has been removed. This is a relatively safe operation since the coating provides a cushion or margin for machining error eliminating the chance that the walls of the hole will be damaged. After removal of the old bushing, a new bushing having a coating may be installed and expanded into the hole.

BRIEF DESCRIPTION OF THE DRAWINGS

Further features and advantages will become apparent from the following detailed description of the preferred and other embodiments of the invention, as illustrated in the accompanying drawings in which like reference characters refer to the same elements or functions throughout the views, and in which:

FIG. 1 is a cross-sectional view of a bushing positioned in a hole in a work piece to form a joint in accordance with the invention;

FIG. 2 is a perspective view of the bushing used in the invention;

FIG. 3 is an exploded view illustrating various components of an assembly used in forming a joint in a work piece.

FIG. 7 is a graph of cycles versus stress.

DETAILED DESCRIPTION OF THE INVENTION

Figure 4:
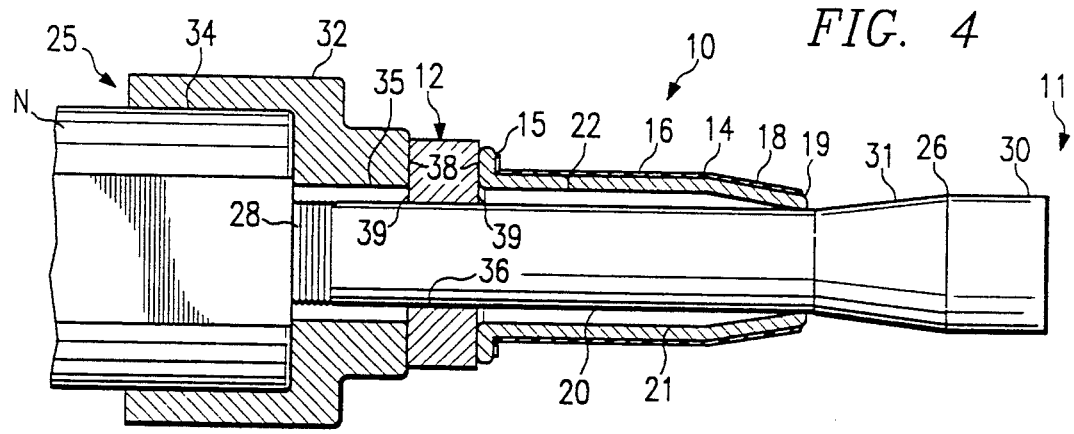
FIGS. 4-6 illustrate the assembly shown in FIG. 3 in use.

The procedure for forming a joint in a work piece in accordance with this invention is generally described in U.S. Pat. No. 4,164,807, the disclosure of which is incorporated herein by reference, except that a coating is placed on an exterior surface of a bushing as will be explained in more detail below. The process for forming a coldworked joint is commonly referred to as the "forcemate" process.

The following is an overview of the forcemate process and the use of a bushing having an exterior surface coating in accordance with this subject invention. FIG. 1 illustrates a coldworked joint formed in work piece or pieces P. A bushing 10 fits inside of a pilot hole H inside of the work piece P. Bushing 10 has a coating 13 on its outside diameter exterior surface. If the bushing has a head flange 15, the coating 13 preferably covers the head flange exterior surface. It should be understood that a headless bushing 10 may be used to carry out the invention. Bushing 10 with coating 13 is held within pilot hole H by a backup member 12 while a mandrel 11 (see FIG. 3) is drawn through the bushing to enlarge the bushing so that the coating comes into engagement with the work piece P so as to induce a radially oriented compressive stress gradient about the hole to increase the fatigue life thereof. The column strength of bushing 10 is sufficient to substantially prevent axial movement of the bushing with respect to the work piece P as the mandrel 11 is forced therethrough so as to substantially eliminate any axially oriented tensile stress in the work piece about the hole H as it is enlarged. Because the bushing is preferably seamless, it is noted that the compressive stress gradient will be induced uniformly a full 360 degrees about the inside circumference of hole H and the full length of the hole.

It is known that if holes through work pieces are enlarged by moving a mandrel therethrough, the material of the work pieces about the holes rebounds or recovers for a certain percentage of the enlargement. This makes the holes after passage of the mandrel therethrough smaller than the largest diameter of the mandrel. The amount of material recovered depends on several factors including the type of material of the work pieces, the mass of material about the hole, the initial diameter of the holes and the amount the holes are enlarged. Because these factors vary, it is difficult to predict what the amount of recovery will be. This is especially true if the amount of enlargement of the holes is not accurately controlled.

It has been found, however, that if the holes are enlarged with a bushing which has less tendency to recover than the material of the work pieces and this bushing is left in the holes after the holes have been enlarged, the size of the resulting hole or passage through the bushing is substantially constant. This is true even through the amount of enlargement of the initial holes through the work piece varies. Therefore, preferably, bushing 10 with coating 13 in this invention is made from material which has less tendency to recover than the material of the work piece P so that when the bushing is left in the hole H after the hole has been coldworked, the hole size remains substantially constant.

Referring now to FIG. 2, bushing 10 with coating 13 includes a side wall 14 with the head flange 15 at one end thereof. The side wall 14 may include a constant diameter cylindrical section 16 adjacent the head flange 15 with a tapered section 18 integral with the end of the cylindrical section 16 opposite the head flange 15. An inwardly directed lip 19 may be provided at the free end of the tapered section 18. Thus, the side wall 14 defines a passage 20 through the center of the bushing 10. The tapered section 18 and lip 19 are provided to facilitate insertion of the bushing into the hole H and to prevent damage to the inside of the hole during insertion. It is to be further understood that the entire side wall 14 may be of constant inside diameter. Also, it should be understood that the outside surface of bushing 10 can be of various other shapes so long as the surface mates with the shape of the holes in the work piece.

The material and the thickness of the side wall 14 are such that the side wall can be radially and circumferentially expanded to coldwork the material of the work piece P about the hole H, but the column strength of the side wall is sufficient to prevent axial movement of the side wall as it is expanded. Also, if the material and the thickness of side wall 14 are selected so that the amount of rebound or recovery of the side wall is substantially less than the material of the work piece P upon radial and circumferential enlargement of the side wall beyond its yield point or elastic limit, then, the amount of rebound of the work piece about the hole H can be controlled in a prescribed manner.

Referring now to FIGS. 3-6, the mandrel 11 is designed for use with a driving unit 25 for forcing the mandrel through bushing 10 with coating 13. The mandrel 11 has an expansion section 26 at one end, a central support section 28, and a gripping section 29 at the opposite end thereof. The expansion section 26 defines a cylindrical sizing surface 30 at its free end with a tapered expansion surface 31 connecting the sizing surface 30 with the support section 28. The diameter $d_1$ of the sizing surface 30 is larger than the inside diameter of cylindrical section 16 of bushing 10 while diameter $d_2$ of support section 28 is smaller than the inside diameter of lip 19 of tapered section 18 of the bushing. The gripping section 29 is adapted to be gripped by the unit 25, as will be explained.

The driving unit 25 includes an adapter 32 and a commercially available lockbolt installation tool (not shown) with a self-releasing pulling nose assembly N (partly shown). The gripping section 29 is provided with grooves or ridges to be engaged by the nose assembly N. The adapter 32 has a large diameter recess 34 receivable over the end of the nose assembly N with a passage 35 through the end thereof aligned with the hole in the end of the nose assembly and when the adapter is in position as shown in FIG. 4. The passage 35 has a diameter such that the sizing surface 30 will just slidably pass therethrough. The adapter 32 serves as a spacer to prevent the expansion section of mandrel 11 from being caught in the nose assembly N since this section is normally larger in diameter than the opening in the end of the nose assembly. The adapter 32 is also removable from the nose assembly N so that the mandrel 11 can be easily removed from the nose assembly manually after each use.

Figure 5:
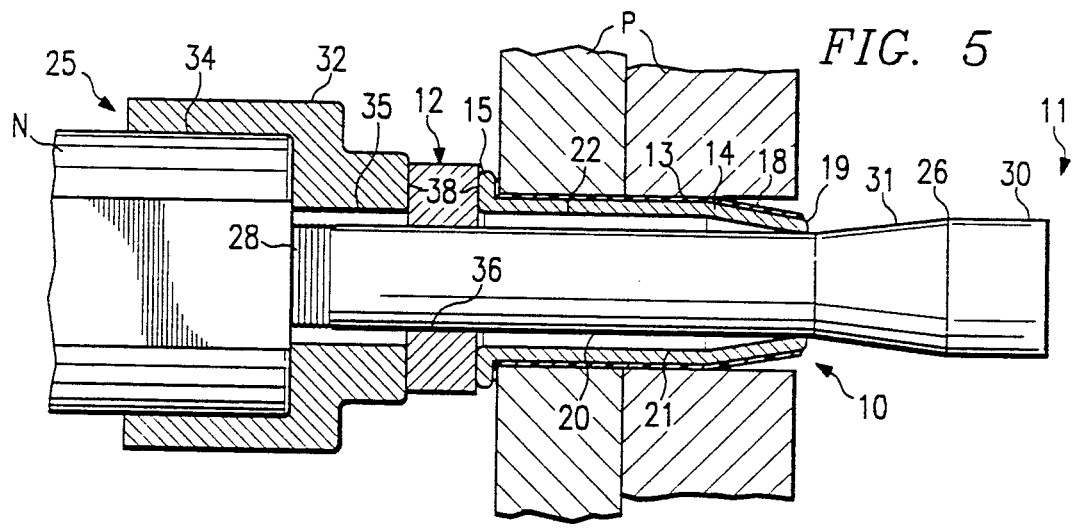
Figure 6:
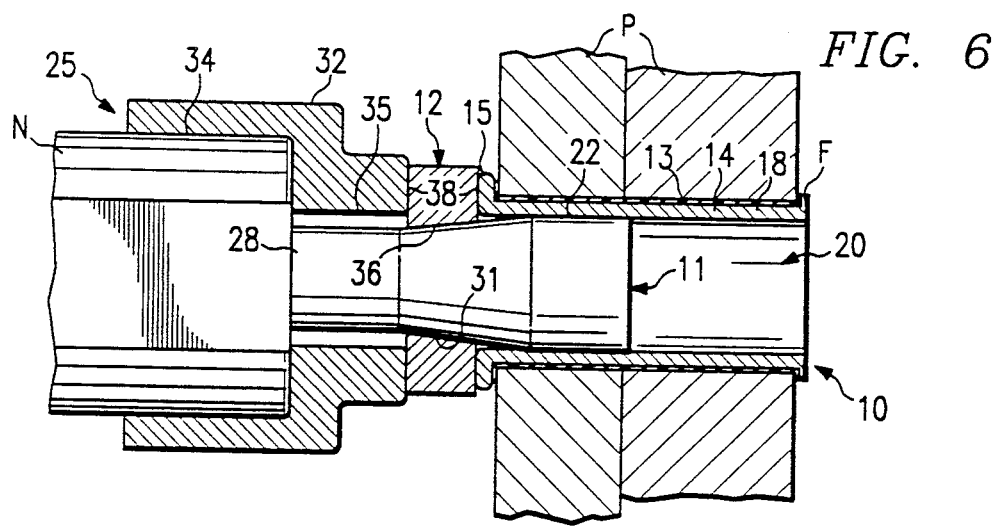

Backup member 12 is also illustrated in FIGS. 3-6. Backup member 12 is washer shaped and defines a central aperture 36 therethrough. Backup member 12 has faces 38, each of which is adapted to face the head flange 15 of the bushing 10 with coating 13. The backup member 12 has a thickness and an outside diameter such that the member is sufficiently strong in compression through its thickness so as to not collapse as the mandrel 11 is being withdrawn to enlarge the bushing 10 with coating 13, but sufficiently weak in a radial direction to allow the expansion section 26 to expand the backup member and enlarge the aperture 36 so that the section 26 can pass therethrough as seen in FIG. 6.

In operation, the pilot holes H are drilled through the work pieces P with a conventional drill. If the diameter $d_1$ of the cylindrical sizing surface 30 is smaller than the initial diameter of the pilot hole H, as is usually the case, the mandrel 11, bushing 10 with coating 13 and backup member 12 can be assembled prior to insertion of the unit into the hole as seen in FIG. 4. This is accomplished by sliding a bushing 10 with coating 13 onto the support section 28 with the tapered section 18 and lip 19 facing the expansion section 26 of mandrel 11. Next, the backup member 12 is slipped onto the support section 28 so that its working face 38 faces the head flange 15 of bushing 10 with coating 13. Next, the gripping section 29 of mandrel 11 is inserted through the passage 35 in adapter 32 until the gripping section 29 is engaged by the nose assembly N as seen in FIG. 4.

The operator can them insert bushing 10 with coating 13 and mandrel 11 through the hole H until the head flange rests against the work piece P, as seen in FIG. 5. The driving unit 25 is then actuated to cause the nose assembly N to pull the mandrel 11 toward it while bearing against the backup member 12 to hold it and the head flange 15 against the work piece P in opposition to the expansion section 26 of the mandrel.

As the tapered expansion surface 31 enters the bushing 10 with coating 13, the tapered section 18 and lip 19 are first straightened and that portion protruding beyond the work piece P is then flared outwardly as indicated by arrow F in FIGS. 1 and 6. This serves to assist in retaining the bushing 10 with coating 13 in proper position within the hole H as the section 26 passes therethrough. The section 26 continues to move through the bushing 10 with coating 13 enlarging the side wall 14 so that the coating 13 comes into contact with the side of hole H and then enlarges the bushing with the coating, and thus coldworks, the hole.

Adding coating 13 to the outside surface of bushing 10 provides certain advantages to the coldworked joint in comparison to coldworked joints having a bushing without a coating. One advantage that coating 13 provides is an increase in the fatigue life of the joint. Another advantage is that the bushing 10 with the coating 13 can be replaced easily during a repair or overhaul operation.

In order to utilize the forcemate process with a bushing 10 having a coating 13, the outside diameter of the bushing must be of a reduced size to account for the thickness of the coating. The metallic bushings used in the forcemate process may be machined in accordance with normal procedures to reduce the outside diameter in size to accommodate the desired coating thickness. The final coating thickness can be from about 0.004 inches to about 0.009 inches. It has been found that a coating of 0.005 inches plus or minus 0.0005 inches in thickness is suitable. Upon insertion and coldworking there may be some slight compression of the coating. Alternatively, bushings having smaller outside diameters than normally used for a particular sized hole in the forcemate process can be used to accommodate the coating.

The outside diameter of the bushing 10 having the smaller outside diameter is then coated with coating 13. Preferably, an epoxy resin is coated to the outside diameter of the bushing 10 using fluidized bed or electrostatic spray application techniques. These techniques used in applying coating 13 result in the thickness of the initial coating being uneven around the circumference of the outside diameter surface of bushing 10. It has been found that an initial thickness of at least about 0.008 inches around the circumference is suitable for later machining to a uniform thickness in the range of 0.045 to 0.055 inches. The coatings can be made of polymeric materials which exhibit excellent tough, high compressive strength, good machinability and which retain these properties in relatively thin structures. 3M Manufacturing Company supplies a suitable epoxy resin referred to as Scotchkote ® brand protective resin No. K1001. Other epoxy resins can also be used. Other materials can be used for the coating. One other material is FM1000/EP15 adhesive film supplied by American Cyanamid Corp., and the other material is #8210 polyurethane estane (supplied by Deerfield Plastics)/120 weave Kevlar adhesive film (supplied by Clark Schwebel Fiberglass Corp.) These alternative materials are not applied to the outside diameter of the bushing by the fluidized bed or electrostatic spray application techniques used for epoxy resins, rather the adhesive films are physically bonded to the outside bushing diameter using epoxy adhesive.

It is important that the coated part have a close tolerance for the most success. Typically the current techniques for applying these coatings normally will not produce these close tolerances, therefore, post-application machining is required. Generally, the thickness of the coating should be rather uniform, and the thickness measured around the circumference should not vary more than 0.001 inches.

Once the suitable coating 13 is applied to the outside diameter of bushing 10, the coated surface of the bushing preferably is machined so that the coating thickness is uniform around the circumference of the outside diameter surface of the bushing. The outside diameter of bushing 10 with coating 13 can be machined until the thickness preferably is uniformly 0.0045 to 0.0055 inches. Once the desired thickness of coating 13 is achieved, the bushing 10 with coating 13 preferably has approximately the same outside diameter as the bushings without coatings which are currently used in the forcemate process.

The coating 13 applied to the outside diameter of bushing 10 is essentially an antifretting barrier which eliminates and/or reduces the fretting which occurs between the outside surface of the bushing and the walls of the hole H in work piece P. Fretting is recognized as a deterioration of the mating surfaces of the bushing and the work piece in contact with each other when there is relative motion between the two surfaces. The coating 13 effectively makes the relative motion more tolerable. The resulting joint has an increased fatigue life compared to the forcemate process joint.

The joints formed by the forcemate process or the subject-invention process described herein have what is called an endurance limit. If the amount of the stress or the load on a joint exceeds the endurance limit, then repeated oscillatory stressing or loading on this joint at a value above the endurance limit will eventually lead to fatiguing of the joint. If the amount of the stress or the load is below the endurance limit, then repeated oscillatory stressing or loading of the joint will not lead to fatiguing. The object of the forcemate process and the process described herein for this subject-invention is to increase the number of cycles of oscillatory stressing or loading that a joint can endure —that is, increase its fatigue life—when the joint is subjected to stresses above its endurance limit. It has been discovered that applying the coating 13 to the outside diameter of the bushing 10 increases the number of cycles of oscillatory stressing that the coldworked joint can endure, in comparison to joints formed by the forcemate process, when the joint is subjected to this stress over the endurance limit.

FIG. 7 illustrates the comparison of the fatigue life of a joint formed by the forcemate process versus the fatigue life of a joint formed by the invention process. The same coupons were used for both tests. The coupons were about five inches in length, 1.8 inches wide and 0.41 inches thick. The ends were rounded. Each coupon contained two holes 1.0 inches in diameter, the centers of which were separated 3 inches. They were made of 6Al-4V titanium. The bushings were cylindrical (with no collar) approximately 0.41 inches in length. The diameters of the bushings were as follows:

|  | Plain (Uncoated) | Coated |
| --- | --- | --- |
| Inside diameter before installation | 0.839-0.841 | 0.839-0.841 |
| Inside diameter after installation and final ream | 0.875-0.876 | 0.875-0.876 |
| Outside diameter before coating if applicable | 0.9975-0.9985* | 0.9875-0.9885** |
| Outside diameter after coating and machining | N.A. | 0.9975-0.9985 |

*Not coated
**Machined to accommodate coating

FIG. 7 is a S-N curve (amount of oscillatory stress versus the number of cycles of stress) for lug coupons made from 6AL-4V Titanium. The amount of oscillatory stress is measured in K.S.I. (thousand pounds per square inches). As can be seen from FIG. 7, the titanium lug coupons having a coating in accordance with this subject-invention can withstand a larger number of cycles of oscillatory stress for a given applied stress before they will fatigue in comparison to the titanium lug coupons without the coating used in the forcemate process. Furthermore, for a given number of cycles of oscillatory stress the titanium lug coupons with the coating can withstand a larger value of stress before they will fatigue.

The endurance limit for the titanium lug coupons is indicated in FIG. 7 by the letters E.L. As can be seen in FIG. 7, the endurance limit is between 15 and 20 KSI. In theory, at this stress level, fatiguing will not occur regardless of the number of cycles of oscillatory stress.

Another advantage of using a bushing 10 with coating 13 in accordance with this invention is that the bushing can be removed and replaced easily during a repair or overhaul operation. As discussed above, once the forcemate bushing has been expanded into contact with the hole in the work piece, it is difficult to replace. Due to the high interference fit, pressing out the forcemate bushing is not recommended as this would damage the walls of the hole in the work piece. Machining out the forcemate bushing is also not suitable since this operation could also damage the walls of the hole in the work piece. Bushing 10 having coating 13 in accordance with this invention overcomes the risk of damage to the walls of the hole. The replacement procedure for the coated bushing involves boring out the old bushing to the point that the bushing collapses or to the point that all the bushing metal has been removed. This is a relatively safe operation since the coating which is preferably approximately 0.005 inches thick provides a cushion or margin for machining error eliminating the chance that the walls of the hole will be damaged. After the removal of the old bushing, a new bushing 10 having a coating 13 may be installed and expanded in the hole using the process discussed above.

While the foregoing illustrates and discloses the preferred and other embodiments of the invention with respect to coldworking a joint using a bushing having a coating and to replacing the bushing, it is to be understood that many changes can be made in the method of coldworking the joint, the type of bushing, the coating placed on the exterior surface of the bushing, the method for removing the bushing from the work piece, and the application of the coated bushings and coldworked joints as a matter of engineering choices without departing from the spirit and scope of the invention a defined by the appended claims.

We claim:

1. A method of coldworking a hole through a work piece to increase the fatigue life of the work piece by reducing fretting to said hole, comprising the steps of:

placing a metal cylindrical tubular member having an antifretting coating on its outside surface within the hole, said antifretting coating is in a state which is machinable to a generally uniform thickness;

holding the tubular member within the hole so that the tubular member is substantially axially fixed with respect to the hole; and passing an expansion mandrel having an expansion section thereon with a maximum diameter greater than the inside diameter of the tubular member axially through the inside of the tubular member to expand the tubular member as the expansion section passes therethrough to force the outside surface of the tubular member outwardly so that said antifretting coating comes into contact with the surface of the walls of the hole and to cause the tubular member having said antifretting coating thereon to uniformly enlarge the hole along its length and induce a compressive stress gradient generally uniformly about the inside circumference of the hole and the full length of the hole.

2. The method of claim 1, further comprising the step of machining said antifretting coating to a generally uniform thickness prior to placing the metal cylindrical tubular member within the hole.

3. A method of providing for a cylindrical tubular member which can be removed from its position in a hole of a work piece, without damaging the walls of the work piece, after the tubular member has been expanded into contact with the walls of a hole of a work piece to coldwork the hole, comprising the steps of:

coating the outside diameter surface of said tubular member with an antifretting coating which is in a state which is machinable to a generally uniform thickness before said tubular member is positioned and expanded within said hole, the thickness of said coating being sufficient to provide a margin of machining error during a machining operation involving boring out said tubular member;

positioning said tubular member having said coating within said hole; and expanding said tubular member so that said coating on said tubular member makes contact with the walls of said hole to uniformly enlarge the hole along its length and induce a compressive stress gradient generally uniformly about the inside circumference of the hole and along the length of the hole.

4. The method of claim 3, further comprising the step of machining said antifretting coating to a generally uniform thickness prior to positioning said tubular member within said hole.

5. An apparatus used for coldworking a hole through a work piece and for reducing fretting to said hole, comprising:

a metal cylindrical tubular member having a prescribed hoop strength sufficiently low to allow said tubular member to be non-elastically radially and circumferentially expanded by an expansion mandrel, and a prescribed column strength sufficient to substantially prevent axial movement of the outside of the tubular member as the tubular member is expanded within the hole; and an antifretting coating applied to the outside diameter surface of said tubular member such that when said expansion mandrel expands the tubular member, said antifretting coating, rather than said outside diameter surface of said tubular member, is forced into contact with the surface of the walls of said hole; said antifretting coating is an adhesive film bonded to said outside diameter surface of said tubular member by an epoxy adhesive.

6. An apparatus used for coldworking a hole through a metal work piece and for reducing fretting to said hole, which is subjected to oscillatory or dynamic loading, comprising:

a metal cylindrical tubular member having a prescribed hoop strength sufficiently low to allow said metal cylindrical tubular member to be non-elastically radially and circumferentially expanded by an expansion mandrel, and a prescribed column strength sufficient to substantially prevent axial movement of the outside of said metal cylindrical tubular member as said metal cylindrical tubular member is expanded within the hole; and an antifretting coating applied to the outside surface of said metal cylindrical tubular member, said antifretting coating is an adhesive film bonded to said outside diameter surface of said tubular member by an epoxy adhesive, said antifretting coating is in a state which is machinable to a generally uniform thickness such that when said expansion mandrel expands said metal cylindrical tubular member, said antifretting coating, rather than said outside surface of said metal cylindrical tubular member, is forced into contact with the surface of the wall of said hole to uniformly enlarge the hole along its length and induce a compressive stress gradient generally uniformly about the inside circumference of the hole and along the length of the hole to increase the fatigue life of the metal work piece.

* * * * *

UNITED STATES PATENT AND TRADEMARK OFFICE
CERTIFICATE OF CORRECTION

Page 1 of 3

PATENT NO. : 5,129,253

DATED : July 14, 1992

INVENTOR(S) : Austin et al.

It is certified that error appears in the above-identified patent and that said Letters Patent is hereby corrected as shown below:

Column 1, line 35, delete "sufficiently" and insert therefore --sufficient--.

Column 1, line 66, after "recommended" insert --,--.

Column 2, line 4, after "fretting" insert --,--.

Column 2, line 7, after "replaced" insert --,--.

Column 2, line 45, after "0.0045" insert --inches--.

Column 2, line 45, after "0.0055" insert --inches--.

Column 4, line 12, after "factors" insert --,--.

Column 4, line 25, delete "through" and insert therefore --though--.

Column 4, line 59, after "wall" insert --14--.

Column 4, line 60, after "then" delete ",".

Column 5, line 5, after "10" insert --,--.

Column 5, line 23, after "assembly N" insert --,--.

Column 5, line 58, delete "them" and insert therefore --then--.

Column 6, line 6, after "13" insert --,--.

Column 6, line 45, delete "0.045" and insert therefore --0.0045 inches--.

UNITED STATES PATENT AND TRADEMARK OFFICE
CERTIFICATE OF CORRECTION

PATENT NO. : 5,129,253
DATED : July 14, 1992
INVENTOR(S) : Austin et al.

It is certified that error appears in the above-identified patent and that said Letters Patent is hereby corrected as shown below:

Column 6, line 45, delete "0.055" and insert therefore --0.0055--.

Column 6, line 46, after "excellent" insert --,--.

Column 6, line 60, delete "resins, rather" and insert therefore --resins.  Rather,--.

Column 7, line 9, after "0.0045" insert --inches--.

Column 8, line 9, delete "a" and insert therefore --an--.

Column 8, line 11, delete "Titanium" and insert therefore --titanium--.

Column 8, line 12, delete "K.S.I." and insert therefore --KSI--.

Column 8, line 36, after "recommended" insert --,--.

Column 8, line 46, after "coating" insert --,--.

Column 8, line 47, after "thick" insert --,--.

Column 8, line 48, after "error" insert --,--.

UNITED STATES PATENT AND TRADEMARK OFFICE
CERTIFICATE OF CORRECTION

PATENT NO. : 5,129,253
DATED : July 14, 1992
INVENTOR(S) : Austin, et. al.

It is certified that error appears in the above-indentified patent and that said Letters Patent is hereby corrected as shown below:

Column 8, line 64, delete "a" and insert therefore --as--.

Signed and Sealed this

Twenty-fourth Day of August, 1993

Attest:

BRUCE LEHMAN

Attesting Officer

Commissioner of Patents and Trademarks